United States Patent
Ishikawa

(10) Patent No.: US 6,748,114 B1
(45) Date of Patent: Jun. 8, 2004

(54) MOVING PICTURE ENCODING METHOD AND MOVING PICTURE ENCODING APPARATUS

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 706 days.

(21) Appl. No.: 09/653,892

(22) Filed: Sep. 1, 2000

(30) Foreign Application Priority Data

Sep. 3, 1999 (JP) .......................................... 11-249722

(51) Int. Cl.[7] ................................................ G06K 9/36
(52) U.S. Cl. ........................ 382/236; 382/218; 348/700
(58) Field of Search .............................. 382/218, 232, 382/236, 238, 272; 348/400.1, 699, 700; 375/240.12

(56) References Cited

U.S. PATENT DOCUMENTS

| | | | |
|---|---|---|---|
| 4,677,466 A | * 6/1987 | Lert, Jr. et al. | 725/22 |
| 5,614,960 A | * 3/1997 | Chiba et al. | 348/700 |
| 5,617,149 A | * 4/1997 | Lee et al. | 348/699 |
| 5,875,003 A | * 2/1999 | Kato et al. | 348/699 |
| 6,115,420 A | * 9/2000 | Wang | 375/240.03 |
| 6,181,382 B1 | * 1/2001 | Kieu et al. | 348/459 |
| 6,317,459 B1 | * 11/2001 | Wang | 375/240.12 |
| 6,449,392 B1 | * 9/2002 | Divakaran et al. | 382/235 |

FOREIGN PATENT DOCUMENTS

| | | |
|---|---|---|
| JP | 7-111631 | 4/1995 |
| JP | 7-193818 | 7/1995 |

OTHER PUBLICATIONS

Meng, et al. "Automatic change detection in a MPEG compressed video sequence", IS&T/SPIE Symposium Proceedings vol. 2419, pp. 1–12, Feb. 1995.*

Liu, et al. "Automatic determination of scene changes in MPEG compressed video", IEEE, pp. 764–767, 1995.*

* cited by examiner

*Primary Examiner*—Daniel Mariam
(74) *Attorney, Agent, or Firm*—Foley & Lardner LLP

(57) ABSTRACT

In a moving picture encoding method and a moving picture encoding apparatus of the present invention, after calculating an absolute value of a difference for every corresponding pixel data between continuous two frames, an interframe difference calculation means 13 calculates an average value per frame and an average value per scene of the absolute value of the difference, and a scene change determination means 14 determines that a scene change has occurred, when the average value per frame is more than or equal to a predetermined number times as large as the average value per scene, and in case that the scene change is detected by the scene change determination means 14, a frame type change means 15 changes a frame type so that interframe predictive coding is not conducted.

20 Claims, 7 Drawing Sheets

MOVING PICTURE ENCODING METHOD AND MOVING PICTURE ENCODING APPARATUS

BACKGROUND OF THE INVENTION

The present invention relates to a moving picture encoding method and a moving picture encoding apparatus for compressing and encoding a moving picture, and more particularly, to a moving picture encoding method and a moving picture encoding apparatus for detecting a frame in which a scene changes, and conducting compression with high coding efficiency.

In recent years, with the progress of digital technology, it has become possible to record and regenerate a moving picture, and to transmit a moving picture using a communication network. Since a digital signal of a moving picture has much more information content than that of a voice signal, a high efficiency encoding technology for a moving picture is indispensable for recording and transmitting the digital signal with high efficiency.

For example, in a moving picture encoding apparatus having a Moving Picture Experts Group (referred to as a "MPEG", hereinafter) method, an image of each frame is predicted in a prediction mode of any one of an I frame, a P frame and a B frame, and a predictive error is encoded and transmitted. Since basically only the predictive error is transmitted, compared with a case in which an image data of each frame is transmitted as it is, a data content can be compressed.

By the way, in the conventional moving picture encoding apparatus, when a sequence consisting of a plurality of scenes is compressed, it is necessary not to conduct predictive coding by crossing over discontinuous scenes. If the predictive coding is conducted by crossing over a scene change, since prediction becomes to be conducted between the frames having low correlation, coding efficiency gets worse and image quality is deteriorated.

To solve such a task, it is necessary to exactly detect a position where the scenes are switched, and not to conduct predictive coding between the frames having low correlation.

With regard to a method of detecting a scene change, as disclosed in JP-A-111631/1995 for example, there is a general method in which differences between continuous two frames are obtained for every pixel data, and it is determined that a scene change occurs when a sum total of their absolute values exceeds a predetermined threshold value.

In this detection method, when a first scene in a stationary state or which only moves slightly, and a second scene that moves somewhat larger than the first scene alternately occur, occurrence of the scene change is detected. However, in such a case, since there is some correlation between the frames, coding efficiency sometime becomes higher if interframe predictive coding is conducted. However, in the conventional method, since, if the scene change is detected, the interframe predictive coding is not made to be conducted, there is a task that coding efficiency gets worse.

Also, in the conventional method, since the scene change is detected based on the correlation with the previous frame, there is a task that erroneous detection occurs if frame interpolation in which the same frames are continuously input is conducted.

Moreover, in a detection method disclosed in JP-A-193818/1995, motion prediction of an input image is conducted, and a sum of absolute values of errors in the prediction is obtained, and an average value obtained by averaging a sum of absolute values of the prediction errors for each frame over a plurality of frames is compared with a sum of absolute values of the individual prediction errors, and thereby, a scene change is detected. However, even in this detection method, there is a task that it does not deal with an input to which frame interpolation has been applied.

SUMMARY OF THE INVENTION

The objective of the present invention is to solve the above-described tasks.

Also, the objective of the present invention is to provide a moving picture encoding method and a moving picture encoding apparatus that are capable of appropriately detecting a scene change, and conducting compression with good coding efficiency.

A moving picture encoding method of the present invention comprises steps of: after calculating an absolute value of a difference for every corresponding pixel data between continuous two frames, calculating an average value per frame and an average value per scene of the above-described absolute value of the difference; and comparing the average value per frame with the average value per scene, and detecting a scene change of a moving picture.

Also, in one example of an arrangement of the moving picture encoding method, in case that the above-described average value per frame is smaller than a predetermined lower limit value, after this average value per frame is updated to the lower limit value, the updated average value is compared with the average value per scene. In this manner, by setting the lower limit value when the average value per frame is calculated, erroneous detection of a small change on a screen can be avoided, and it is possible to exactly detect the scene change.

Also, in one example of an arrangement of the moving picture encoding method, in case that the above-described absolute value of the difference is larger than a predetermined upper limit value, after the absolute value of the difference is updated to the upper limit value, the average value per frame and the average value per scene are calculated. In this manner, by setting the upper limit value when the absolute value of the difference is calculated for every pixel data, since to increase an average value of a whole frame is prevented even for a scene in which there is locally a large change on a part of a screen, erroneous detection can be avoided, and it is possible to exactly detect the scene change.

Also, in one example of an arrangement of the moving picture encoding method, in case that the above-described average value per frame is zero, after the average value per frame is updated to an average value per frame, which was calculated just before, the updated average value is compared with the average value per scene. In this manner, in case that the average value per frame is zero, by using the average value per frame, which was calculated just before, since to make the average value per scene go wrong is prevented by excluding the case in which the average value per frame is zero, erroneous detection can be avoided, and it is possible to exactly detect the scene change even in a case in which the same frames are continuously input because an input frame rate is lower than an output frame rate, and frame interpolation is needed.

Also, in one example of an arrangement of the moving picture encoding method, in compressing a moving picture by combining intra-frame coding, which conducts coding with processing within a frame, with interframe predictive coding using a reference frame before or after with respect to time, in case that the above-described scene change is detected, interframe predictive coding is not conducted. In this manner, in case that the scene change is detected in compressing the moving picture, by changing a frame type so that the intra-frame coding is conducted without conducting the predictive coding between frames having low correlation, since the predictive coding does not become to be conducted by crossing over discontinuous scenes, it is possible to conduct compression with good coding efficiency.

Also, in one example of an arrangement of the moving picture encoding method, when the above-described average value per frame is more than or equal to a predetermined number times as large as the average value per scene, it is determined that the above-described scene change has occurred.

Also, in one example of an arrangement of the moving picture encoding method, the absolute value of the difference is calculated for each of a luminance component and a color difference component.

Also, in one example of an arrangement of the moving picture encoding method, in case that the above-described absolute value of the difference is less than or equal to a predetermined upper limit value and is less than or equal to a predetermined lower limit value, after the absolute value of the difference is updated to the lower limit value, the average value per frame and the average value per scene are calculated. In this manner, by setting the upper and lower limit values when the absolute value of the difference is calculated for every pixel data, even though there is a part in an input image in which a change content is locally large, the influence thereof on an average value per frame can be suppressed, and it is possible to suppress the erroneous detection of a scene change.

Moreover, a moving picture encoding apparatus of the present invention comprises: calculation means for, after calculating an absolute value of a difference for every corresponding pixel data between continuous two frames, calculating an average value per frame and an average value per scene of the absolute value of the difference; and determination means for comparing the average value per frame with the average value per scene, and detecting a scene change of a moving picture.

Also, in one example of an arrangement of the moving picture encoding apparatus, in case that the above-described average value per frame is smaller than a predetermined lower limit value, the above-described calculation means updates the average value per frame to the lower limit value.

Also, in one example of an arrangement of the moving picture encoding apparatus, in case that the above-described absolute value of the difference is larger than a predetermined upper limit value, after updating the absolute value of the difference to the upper limit value, the above-described calculation means calculates the average value per frame and the average value per scene.

Also, in one example of an arrangement of the moving picture encoding apparatus, in case that the above-described average value per frame is zero, the above-described calculation means updates the average value per frame to an average value per frame, which was calculated just before.

Also, in one example of an arrangement of the moving picture encoding apparatus, in compressing a moving picture by combining intra-frame coding, which conducts coding with processing within a frame, with interframe predictive coding using a reference frame before or after with respect to time, the apparatus further includes means for making interframe predictive coding not to be conducted in case that the scene change is detected by the above-described determination means.

Also, in one example of an arrangement of the moving picture encoding apparatus, when the above-described average value per frame is more than or equal to a predetermined number times as large as the average value per scene, the above-described determination means determines that the scene change has occurred.

Also, in one example of an arrangement of the moving picture encoding apparatus, the above-described calculation means calculates the absolute value of the difference for each of a luminance component and a color difference component.

Also, in one example of an arrangement of the moving picture encoding apparatus, in case that the above-described absolute value of the difference is less than or equal to a predetermined upper limit value and is less than or equal to a predetermined lower value, after updating the absolute value of the difference to the lower limit value, the calculation means calculates the average value per frame and the average value per scene.

BRIEF DESCRIPTION OF THE DRAWINGS

This and other objects, features and advantages of the present invention will become more apparent upon a reading of the following detailed description and drawings, in which:

FIG. 8 is a view showing one example of a frame average value and a scene average value during fade-in;

FIG. 9 is a view showing one example of a frame average value and a scene average value during fade-in;

DESCRIPTION OF THE EMBODIMENTS

Figure 1:
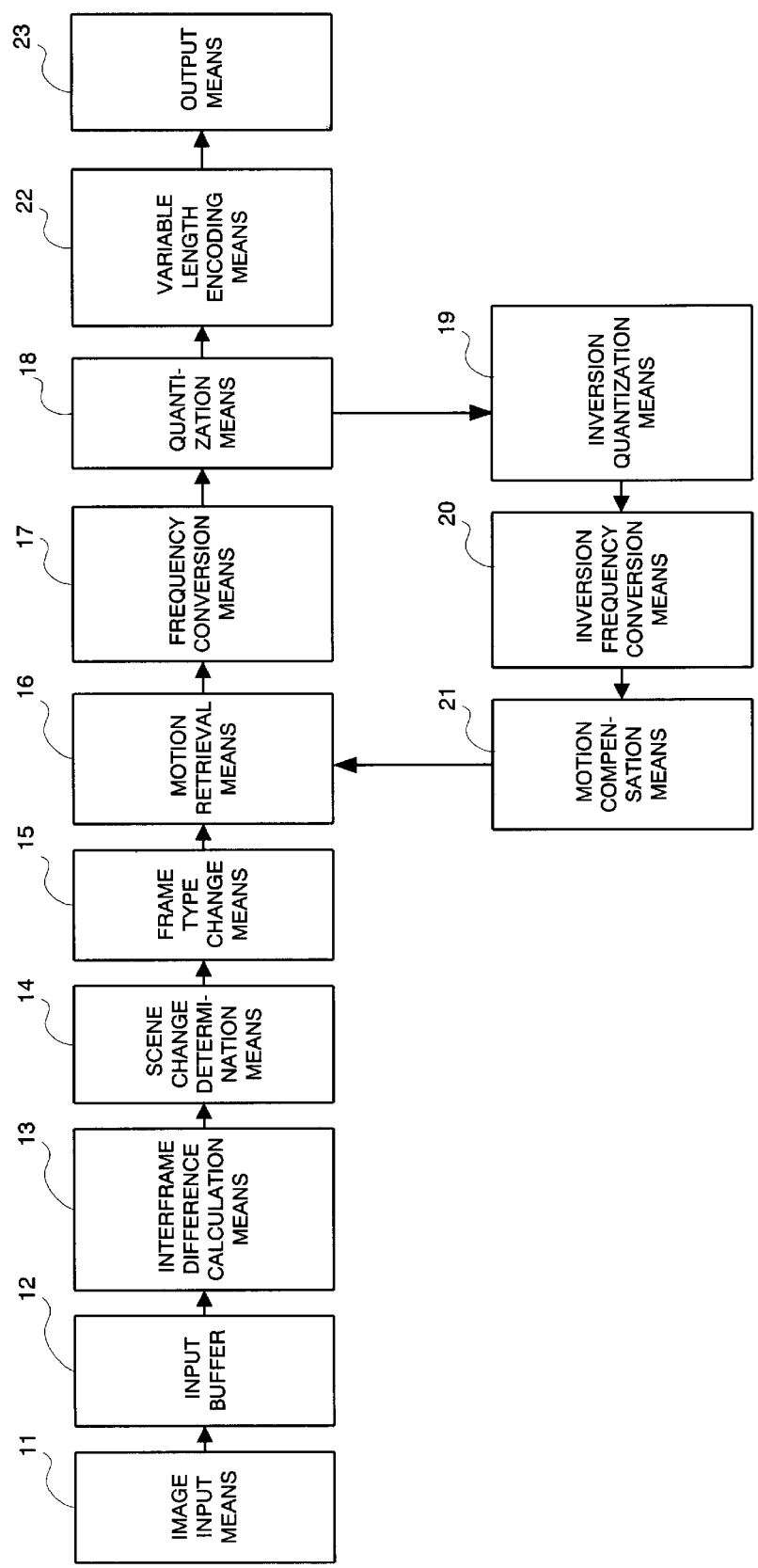
FIG. 1 is a block diagram showing an arrangement of a moving picture encoding apparatus that is a first embodiment of the present invention.

Referring to the drawings, embodiments of the present invention will be explained in detail.

The First Embodiment

FIG. 1 is a block diagram showing an arrangement of a moving picture encoding apparatus that is the first embodiment of the present invention. The present invention is to provide an arrangement that detects a frame in which a scene changes, and conducts compression with good coding efficiency.

One embodiment of the moving picture encoding apparatus of the present invention is constructed of an image input means 11, an input buffer 12, an interframe difference calculation means 13, a scene change determination means 14, a frame type change means 15, a motion retrieval means 16, a frequency conversion means 17, a quantization means 18, an inversion quantization means 19, an inversion frequency conversion means 20, a motion compensation means 21, a variable length encoding means 22, and an output means 23.

These means generally operate as follows, respectively: The image input means 11 takes an image therein at the unit of one frame from a camera and so forth. The image that was taken in is stored in the input buffer 12 until a certain number of frames are accumulated.

After calculating an absolute value of a difference for every corresponding pixel data between continuous two frames, the interframe difference calculation means 13 calculates an average value per frame and an average value per scene of the absolute value of the difference.

The scene change determination means 14 compares the average value per frame of the absolute value of the difference with the average value per scene and obtains correlation of a scene, and determines whether a scene change has occurred.

When it is determined by the scene change determination means 14 that the scene change has occurred, the frame type change means 15 changes the current frame arrangement to an optimum frame arrangement so that predictive coding between frames having low correlation is not conducted, and makes intra-frame coding to be conducted.

In conducting the interframe predictive coding, the motion retrieval means 16 obtains correlation between a frame stored as a reference frame and a current frame to be processed, and obtains a difference data between a macro-block of the frame to be processed and a macro-block of the reference frame having high correlation with the frame to be processed.

The frequency conversion means 17 converts an image data into a frequency component by means of a DCT (Discrete Cosine Transform) operation and so forth in case of conducting the intra-frame coding, and converts the difference data input from the motion retrieval means 16 into a frequency component in case of conducting the interframe predictive coding.

The quantization means 18 quantizes an output from the frequency conversion means 17.

The variable length encoding means 22 applies variable length coding to an output from the quantization means 18. A compressed code obtained by means of the variable length coding is output from the output means 23.

Also, for making a reference frame for the next frame compression, the inversion quantization means 19 inversely quantizes an output from the quantization means 18, and the inversion frequency conversion means 20 applies inverse frequency conversion to an output from the inversion quantization means 19.

And, the motion compensation means 21 applies motion compensation to a data input from the inversion frequency conversion means 20, and makes a data of the reference frame.

Figure 2:
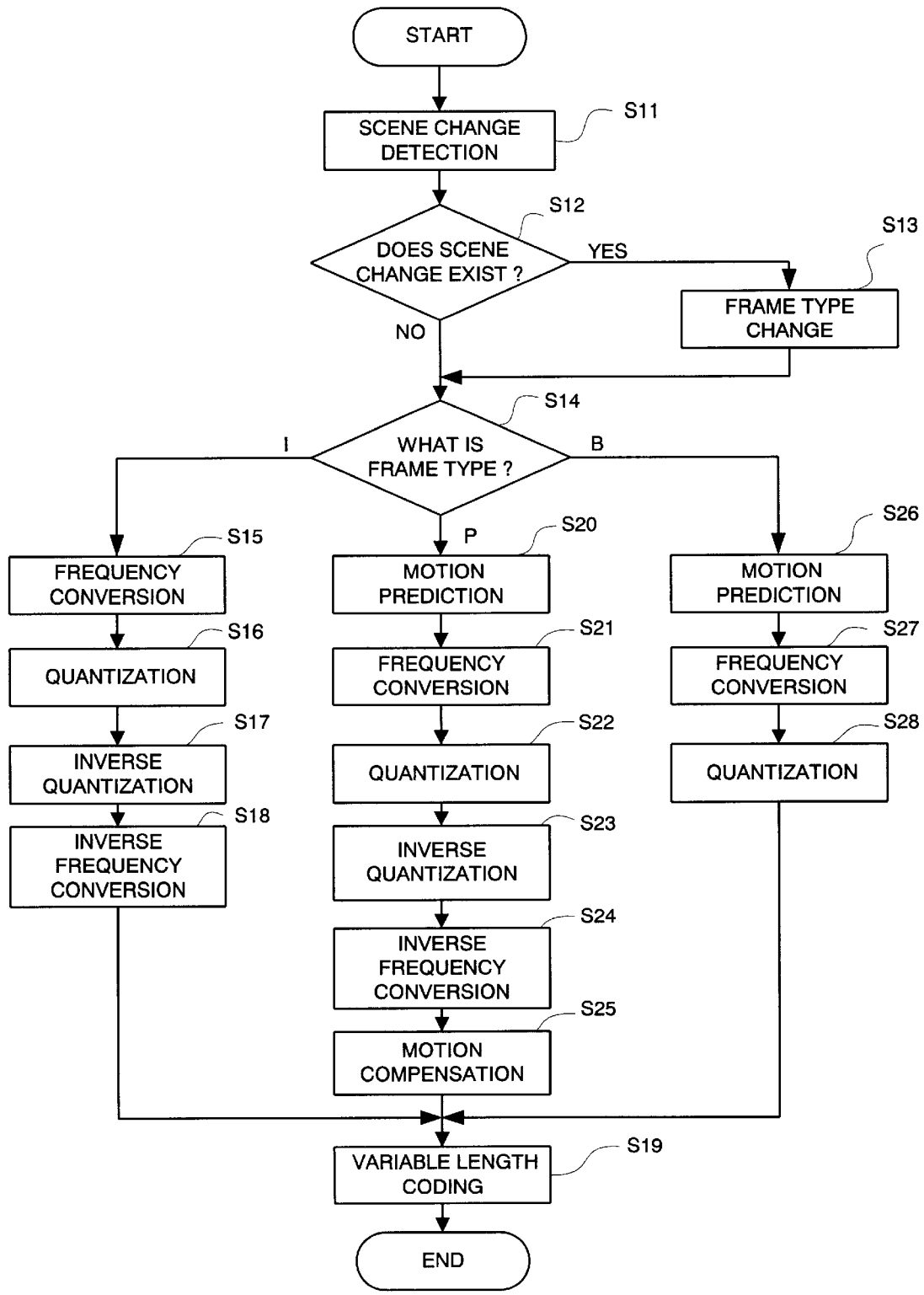
FIG. 2 is a flowchart for explaining the operation of the moving picture encoding apparatus in FIG. 1.

Next, referring to FIG. 2, the operation of the moving picture encoding apparatus in FIG. 1 will be explained more in detail. FIG. 2 is a flowchart for explaining the operation of the moving picture encoding apparatus in FIG. 1. In this embodiment, as one example of a moving picture encoding method in which intra-frame coding, which conducts coding with processing within a frame, is combined with interframe predictive coding using a reference frame before or after with respect to time, and a moving picture is compressed and encoded, an example of an MPEG1 will be explained.

First, when an image data is input to the interframe difference calculation means 13 through the image input means 11 and the input buffer 12, after calculating an absolute value of a difference for every corresponding pixel data between continuous two frames, namely, which stands at the same position between a current frame to be processed and a frame that was input just before, the interframe difference calculation means 13 calculates an average value per frame and an average value per scene of the absolute value of the difference.

The scene change determination means 14 compares the average value per frame of the absolute value of the difference with the average value per scene, which were obtained by the interframe difference calculation means 13, and obtains correlation between frames, and determines whether a scene change has occurred (step S11 in FIG. 2).

In case that it is determined that the scene change has occurred until the minimum number of frames necessary for the compression are read (YES in step S12), the frame type change means 15 changes a P frame stored in the input buffer 12 to an I frame (step S13).

Figure 3:
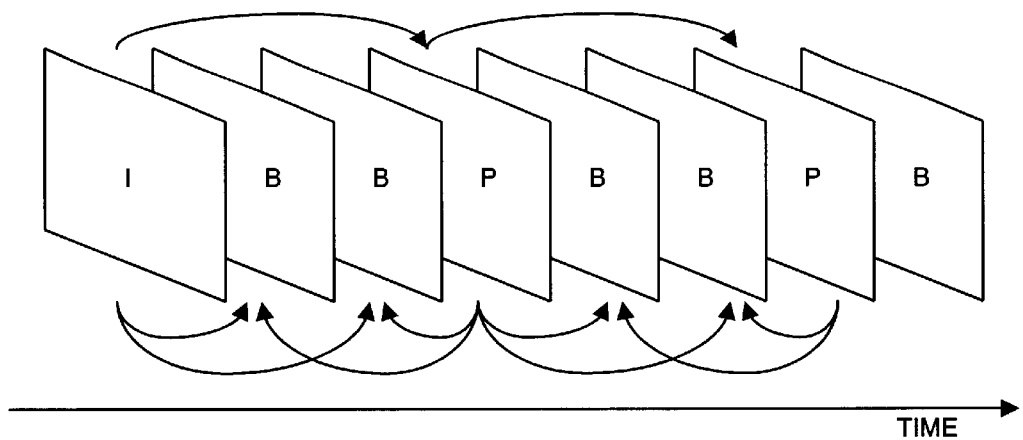
FIG. 3 is a view showing a frame arrangement of an MPEG1.

Here, a frame arrangement of the MPEG1 will be explained. FIG. 3 is a view showing the frame arrangement of the MPEG1, FIG. 4 is a view showing a reference relationship between respective frames by means of a conventional moving picture encoding apparatus, and FIG. 5 is a view showing a reference relationship between respective frames by means of the moving picture encoding apparatus in this embodiment.

Figure 4:
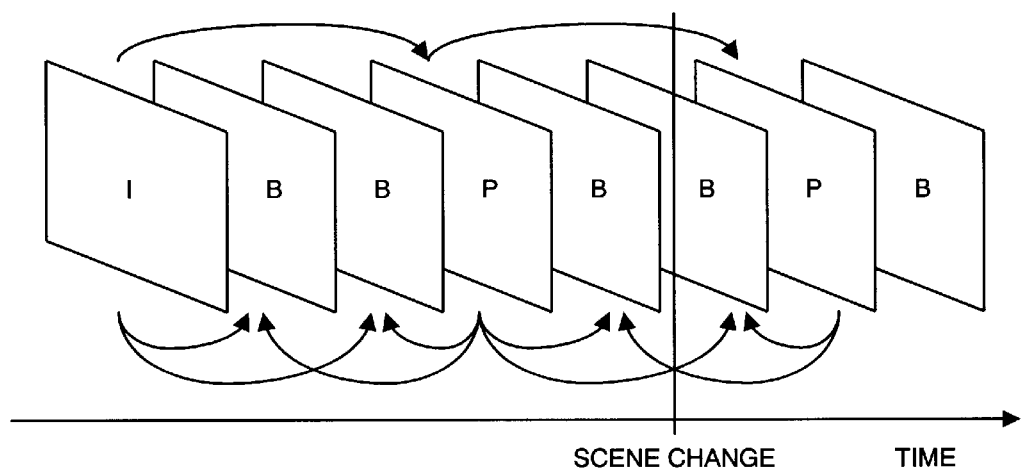
FIG. 4 is a view showing a reference relationship between respective frames by means of a conventional moving picture encoding apparatus.
Figure 5:
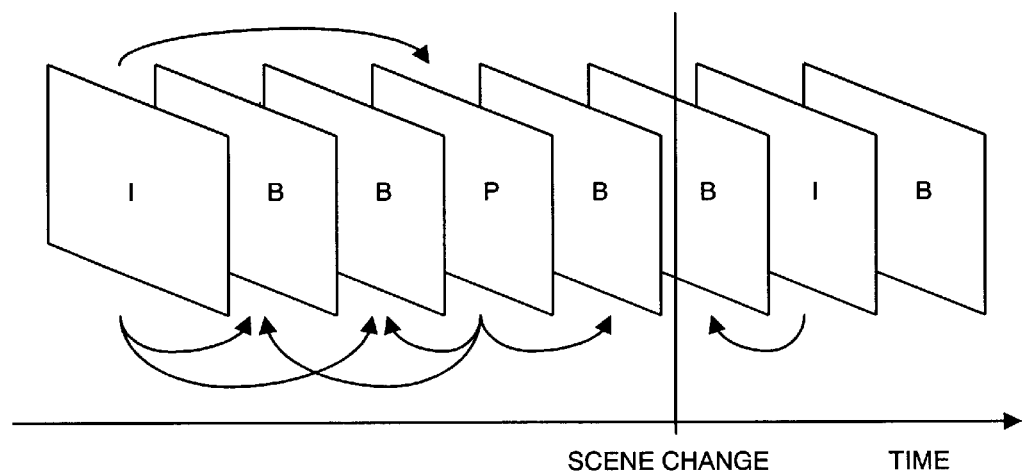
FIG. 5 is a view showing a reference relationship between respective frames by means of the moving picture encoding apparatus in FIG. 1.

In addition, arrows in FIG. 3 to FIG. 5 indicate that a frame at a start point is referred to when a frame of an end point is encoded.

In a frame type of the MPEG1, there are three kinds of frames: an I frame that is encoded by means of processing within a frame without prediction, a P frame that is predicted from a reference frame positioned before with respect to time, and a B frame that is predicted from a reference frame positioned before or after with respect to time.

In an example of FIG. 3, the minimum number of frames necessary for the compression are four frames from a frame that is a reference frame to the next reference frame, and the minimum number of frames are constructed of I, B, B and P frames or P, B, B and P frames.

Since the I frame and the P frame become to be reference frames for prediction, the reference frames must be made by the processing by means of the inversion quantization means 19, the inversion frequency conversion means 20 and the motion compensation means 21 in FIG. 1. Since the prediction is based on the principle that "correlation is high between continuous frames", if a frame before or after with respect to time, which crosses over a scene change, is referred to, correlation between the frames becomes low, and coding efficiency is reduced. Accordingly, it is possible to improve coding efficiency by changing a frame arrangement so that a reference in which discontinuous scenes are crossed is not conducted.

In the conventional moving picture encoding apparatus, if a scene change occurs at a position shown in FIG. 4, a P frame just after the scene change is created by referring to a P frame before with respect to time of a different scene, and conducting predictive coding. Due to this, coding efficiency gets worse and unexpected code contents become to occur.

Accordingly, in the present invention, as shown in FIG. 5, a P frame just after a scene change is changed to an I frame so that a frame before or after with respect to time, which crosses over the scene change, is not referred to. Thereby, since a content of generated codes becomes to be an expected content generated by means of intra-frame coding, deterioration of image quality due to a change for the worse of coding efficiency can be suppressed.

In this manner, when the scene change occurs, the frame type is changed so that coding efficiency becomes good (step S13), and compression is conducted for every frame type of the frame to be processed (step S14).

In case that a current frame to be processed is an I frame, motion prediction by means of the motion retrieval means 16, which will be mentioned later, is not conducted. Accordingly, an image data of the I frame, which is stored in the input buffer 12, is input to the frequency conversion means 17 as it is.

The frequency conversion means 17 converts the image data of the I frame into a frequency component for every block of eight by eight pixels (step S15), and the quantization means 18 quantizes an output (a conversion coefficient) from the frequency conversion means 17 (step S16).

Also, for making a reference frame, the inversion quantization means 19 inversely quantizes an output from the quantization means 18 (step S17), and the inversion frequency conversion means 20 applies inverse frequency conversion to an output from the inversion quantization means 19 (step S18).

The data of the I frame, which was decoded in this manner, is sent to the motion retrieval means 16, and in the processing below, it is referred to as a reference frame.

The variable length encoding means 22 applies variable length coding to an output from the quantization means 18 (step S19). A compressed code obtained by means of the variable length coding is output from the output means 23.

In case that a current frame to be processed is a P frame, the motion retrieval means 16 detects a motion vector for every macro-block (sixteen by sixteen pixels) between the stored reference frame and the frame to be processed, which is stored in the input buffer 12. And, the motion retrieval means 16 applies motion compensation to a macro-block of the reference frame in accordance with the motion vector, in other words, the motion retrieval means 16 shifts a position of the macro-block of the reference frame in accordance with the motion vector, and obtains a difference data between the macro-block of the frame to be processed and the macro-block of the reference frame having high correlation with the frame to be processed, to which the motion compensation was applied (step S20).

The frequency conversion means 17 converts the difference data input from the motion retrieval means 16 into a frequency component for every block of eight by eight pixels (step S21), and the quantization means 18 quantizes an output from the frequency conversion means 17 (step S22).

Also, for making a reference frame, the inversion quantization means 19 inversely quantizes an output from the quantization means 18 (step S23), and the inversion frequency conversion means 20 applies inverse frequency conversion to an output from the inversion quantization means 19 (step S24).

In case that the current frame to be processed is a P frame, a data obtained by the inversion frequency conversion means 20 is the difference data. Accordingly, the motion compensation means 21 adds the difference data input from the inversion frequency conversion means 20 to the reference frame to which the above-described motion compensation was applied (step S25). Thereby, the original P frame is decoded. A data of this P frame is sent to the motion retrieval means 16, and in the processing below, it is referred to as a reference frame.

The variable length encoding means 22 applies variable length coding to an output from the quantization means 18 (step S19). A compressed code obtained by means of the variable length coding is output from the output means 23.

In case that a current frame to be processed is a B frame, the motion retrieval means 16 detects a motion vector for every macro-block between the stored reference frame and the frame to be processed, which is stored in the input buffer 12. And, the motion retrieval means 16 applies motion compensation to a macro-block of the reference frame in accordance with the motion vector, and obtains a difference data between the macro-block of the frame to be processed and the macro-block of the reference frame having high correlation with the frame to be processed, to which the motion compensation was applied (step S26).

The frequency conversion means 17 converts the difference data input from the motion retrieval means 16 into a frequency component for every block of eight by eight pixels (step S27), and the quantization means 18 quantizes an output from the frequency conversion means 17 (step S28).

The variable length encoding means 22 applies variable length coding to an output from the quantization means 18 (step S19). A compressed code obtained by means of the variable length coding is output from the output means 23.

In addition, since the B frame does not become to be a reference frame, a reference frame is not made by the inversion quantization means 19, the inversion frequency conversion means 20 and the motion compensation means 21.

Figure 6:
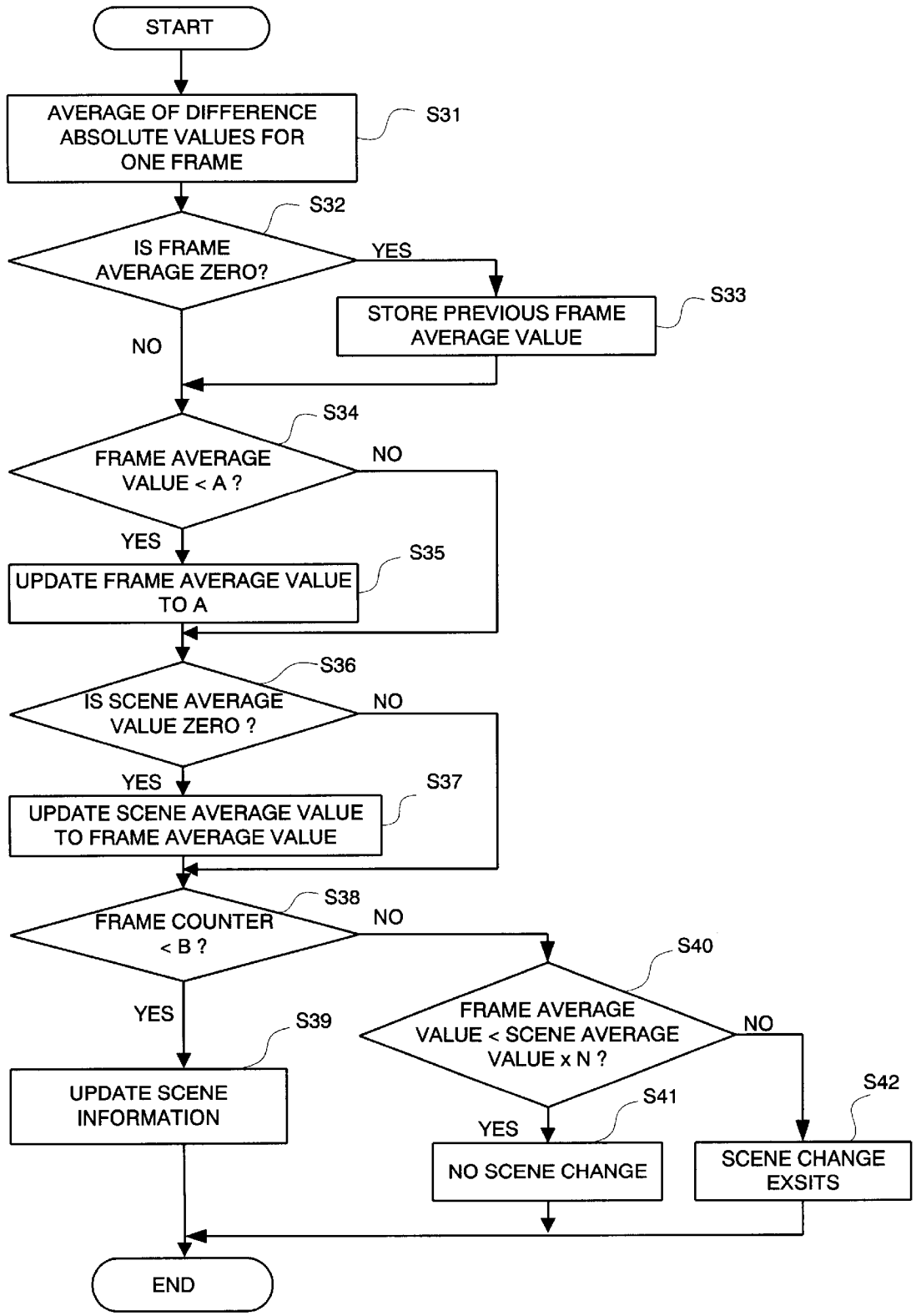
FIG. 6 is a flowchart for explaining scene change detecting processing.

Next, the present invention will be explained using a particular example. FIG. 6 is a view explaining a process flow of scene change detection, and is a flowchart for explaining scene change detecting processing shown at the step S11 in FIG. 2. The processing of this FIG. 6 is repeated for every frame to be processed.

First, the interframe difference calculation means 13 obtains difference values for each of luminance and a color difference for every corresponding pixel data that stands at the same position between a current frame to be processed and a frame that was input just before, and converts these difference values into absolute values. Successively, the interframe difference calculation means 13 obtains a sum total of difference absolute values for one frame, and obtains an average value per macro-block, which does not depend on an image size, from this sum of the difference absolute values (step S31 in FIG. 6).

Here, the macro-block indicates a region consisting of two components that are a luminance component of sixteen by sixteen pixels and a color difference component of eight by eight pixels.

Assuming that an image size of the frame to be processed is 720×480 pixels, and that a sum of the difference absolute values of the frame to be processed is 8200, an average of the difference absolute values per macro-block in this frame becomes to be 8200×(16×16/(720×480))=6.

In case that an average (referred to as a frame average value, hereinafter) of the difference absolute values per macro-block in the frame to be processed is zero (YES at step S32), the interframe difference calculation means 13 determines that a frame same as a just previous frame has been input, and instead of zero, makes a frame average value obtained in the just previous frame to be a frame average value of the current frame (step 33).

Successively, the interframe difference calculation means 13 compares the calculated frame average value with a predetermined threshold value A (step S34).

The threshold value A that is a predetermined fixed value represents a lower limit value of the frame average value. This threshold value A is determined by obtaining a frame average value when a camera gently causes panning for example.

In case that the frame average value is smaller than the threshold value A, the interframe difference calculation means 13 updates the frame average value to the threshold value A (step S35).

Also, the interframe difference calculation means 13 obtains an average of the respective frame average values for every scene by means of processing that will be mentioned later, and calculates an average (referred to as a scene average value, hereinafter) of difference absolute values per the same scene.

Since, as mentioned below, a scene average value is made to be zero just after a scene change is detected, in case that the scene average value is zero (YES at step S36), the interframe difference calculation means 13 makes the calculated frame average value to be a scene average value, and stores the current frame average value therein (step S37).

Next, the scene average value is unstable just after the scene change occurs. Accordingly, the interframe difference calculation means 13 does not conduct the next scene change detection until a frame counter reaches a fixed frame number threshold value B (B=5, for example) once the scene change is detected.

In other words, in case that a value of the frame counter is smaller than the frame number threshold value B (YES at step S38), the interframe difference calculation means 13 obtains an average of the current scene average value and frame average value, and makes this average to be a new scene average value, and counts up a value of the frame counter by one, which shows the number of the frames that were already processed (step S39).

The above processing is repeated for every frame to be processed, and in case that a value of the frame counter is more than or equal to the frame number threshold value B at the step 38, the interframe difference calculation means 13 provides the scene change determination means 14 with instruction on the execution of the scene change detecting processing. In accordance with this instruction, the scene change determination means 14 compares the scene average value with the frame average value (step S40).

If a frame average value is obtained when a scene is switched, since an average of difference absolute values becomes to be obtained between frames that do not have correlation, the frame average value rapidly increases.

In case that the frame average value is smaller than N (N=2, for example) times as large as the scene average value, the scene change determination means 14 determines that a scene change does not exist.

In case that it is determined by the scene change determination means 14 that the scene change does not exist, the interframe difference calculation means 13 obtains an average of the current scene average value and frame average value, and makes this average to be a new scene average value (step S41).

On the other hand, in case that the frame average value is larger than or equal to N (N=2, for example) times as large as the scene average value, the scene change determination means 14 determines that a scene change has occurred.

In case that it is determined by the scene change determination means 14 that the scene change has occurred, the interframe difference calculation means 13 initializes the current scene average value and frame average value to zero, and further, initializes a value of the frame counter to zero (step S42). In this manner, the scene change can be detected.

FIG. 7 to FIG. 11 are views showing one example of a frame average value and a scene average value, respectively. In each of FIG. 7 to FIG. 11, an axis of abscissa indicates the frame number, and an axis of ordinate indicates a frame average value. Also, an underlined numerical value is a scene average value that is calculated by including a just previous (left-hand next) frame average value.

Figure 7:
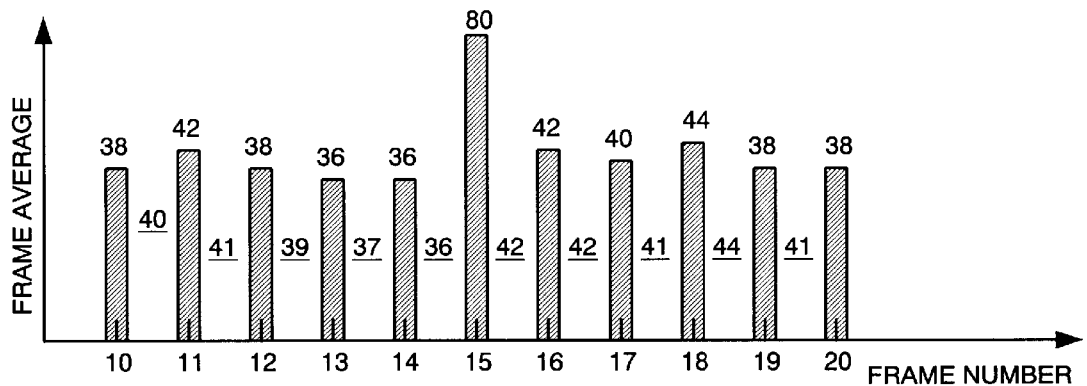
FIG. 7 is a view showing one example of a frame average value and a scene average value when a scene change is detected.

In an example of FIG. 7, frame average values from the $10^{th}$ frame and scene average values are shown. Assuming that a scene average value at a time point when the processing of the $10^{th}$ frame is completed is 40, since a frame average value of the $11^{th}$ frame is 42, in the processing of the $11^{th}$ frame, the frame average value is smaller than N (here, N=2) times as large as the scene average value, and the scene change determination means 14 determines that a scene change does not exist.

A scene average value at a time point when the processing of the $11^{th}$ frame is completed is updated to (40+42)/2=41 by means of the processing at the step S41 in FIG. 6.

Next, since a scene average value at a time point when the processing of the $14^{th}$ frame is completed is 36, and a frame average value of the $15^{th}$ frame is 80, in the processing of the $15^{th}$ frame, the frame average value is larger than or equal to N (N=2) times as large as the scene average value, and the scene change determination means 14 determines that a scene change has occurred.

In this case, after a scene average value at a time point when the processing of the $15^{th}$ frame is completed (a scene average value described right adjacent to the frame average value 80 of the $15^{th}$ frame) is initialized to zero by means of the processing at the step S42 in FIG. 6, in the processing of the next $16^{th}$ frame, it is updated to a frame average value 42 of the $16^{th}$ frame by means of the processing at the step S37.

Figure 8:
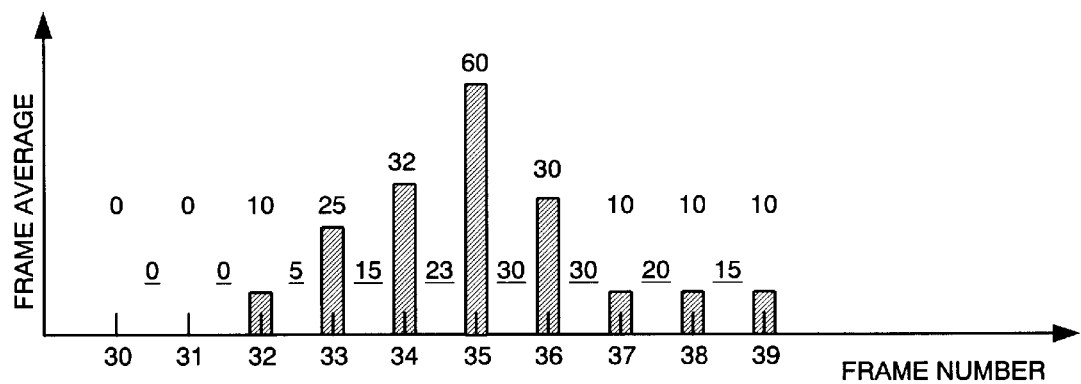
Figure 9:
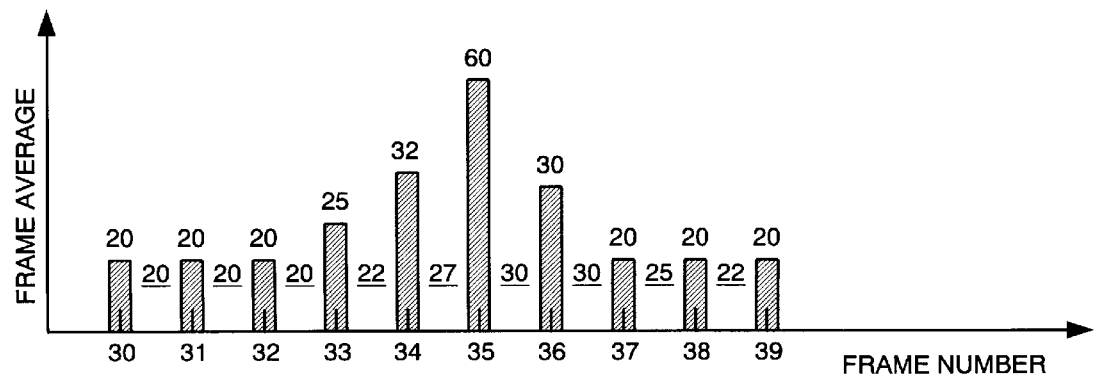

FIG. 8 and FIG. 9 show a frame average value and a scene average value during fade-in, respectively, in which a bright image gradually comes up to a whole screen from a black image.

And, FIG. 8 shows a case in which a lower limit value is not set for a frame average value in the moving picture encoding apparatus of this embodiment.

As shown by the $30^{th}$ frame and the $31^{st}$ frame in FIG. 8, in a part of a black image, frame average values become to be zero. In contrast with this, as a bright image comes up as shown after the $32^{nd}$ frame, a frame average value rapidly increases. Therefore, there is a possibility that occurrence of a scene change is erroneously detected in the $32^{nd}$ frame, the $33^{rd}$ frame and so forth.

Accordingly, in the moving picture encoding apparatus of this embodiment, in order to prevent the erroneous detection when a whole screen gently changes due to a fading effect and so forth, the processing explained at the steps S34 and S35 is conducted.

Thereby, in the 30$^{th}$ frame to the 32$^{nd}$ frame and the 37$^{th}$ frame to 39$^{th}$ frame in which the frame average value is below the threshold value A (here, A=20), since, as shown in FIG. 9, the frame average value is updated to the threshold value A, the erroneous detection that a scene change has occurred in the 32$^{nd}$ frame, the 33$^{rd}$ frame and so forth can be eliminated, and it is possible to exactly detect a scene change in the processing of the 35$^{th}$ frame.

Figure 10:
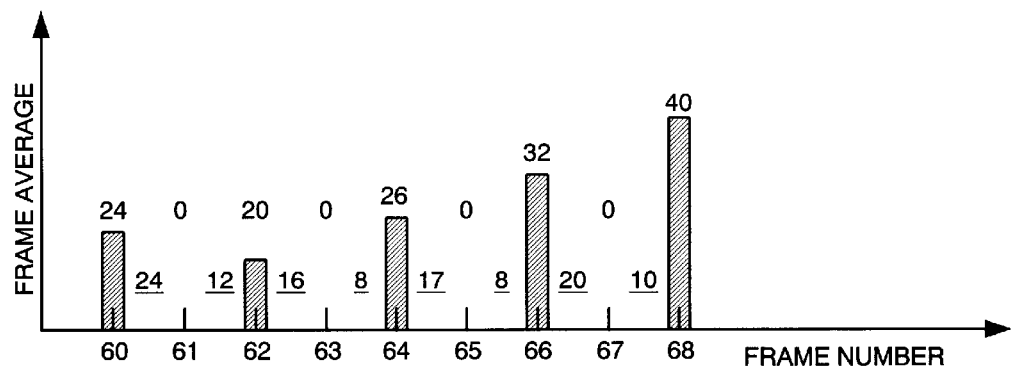
FIG. 10 is a view showing one example of a frame average value and a scene average value when an image data to which frame interpolation is applied is input.
Figure 11:
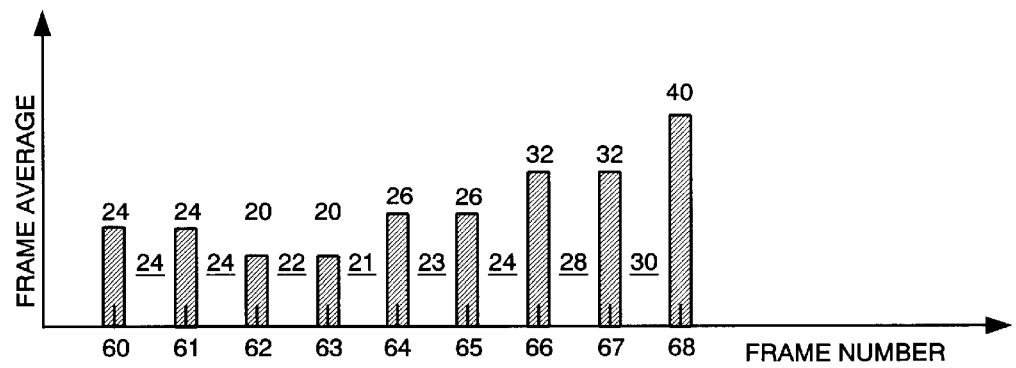
FIG. 11 is a view showing one example of a frame average value and a scene average value when an image data to which frame interpolation is applied is input.

FIG. 10 and FIG. 11 show a frame average value and a scene average value when an image data to which frame interpolation is applied is input, and show the operation when an image data is compressed by converting its frame number 15 per second into 30.

In case that the frame number per unit time is less than that of an MPEG standard, a method in which interpolation is conducted by copying the same frame is general. This is the same for an application for moving picture editing, and if the interpolated image data is input, since an average of difference absolute values between the same frames becomes to be obtained, a frame average value becomes to be zero, and there is a possibility that occurrence of a scene change is erroneously detected.

FIG. 10 shows a case in which the processing explained at the steps S32 and S33 in FIG. 6 is not conducted in the moving picture encoding apparatus of this embodiment.

In FIG. 10, since an image data is interpolated for every frame, a frame average value becomes to be zero every other frame. Accordingly, a scene average value becomes to be a small value, and occurrence of a scene change is erroneously detected in the 64$^{th}$ frame.

In contrast with this, if the processing at the steps S32 and S33 is conducted like in the moving picture encoding apparatus of this embodiment, in case that a frame average value is zero, a frame average value obtained in a just previous frame is made to be a frame average value of the current frame.

For example, since a frame average value of the 60$^{th}$ frame is 24, at a time point when a frame average value becomes to be zero in the processing of the 61$^{st}$ frame, the frame average value of the 61$^{st}$ frame is updated to the frame average value 24 of the 60$^{th}$ frame as shown in FIG. 11.

In this manner, since it is prevented that the scene average value becomes to be a wrong value, the erroneous detection of a scene change can be avoided.

The Second Embodiment

Figure 12:
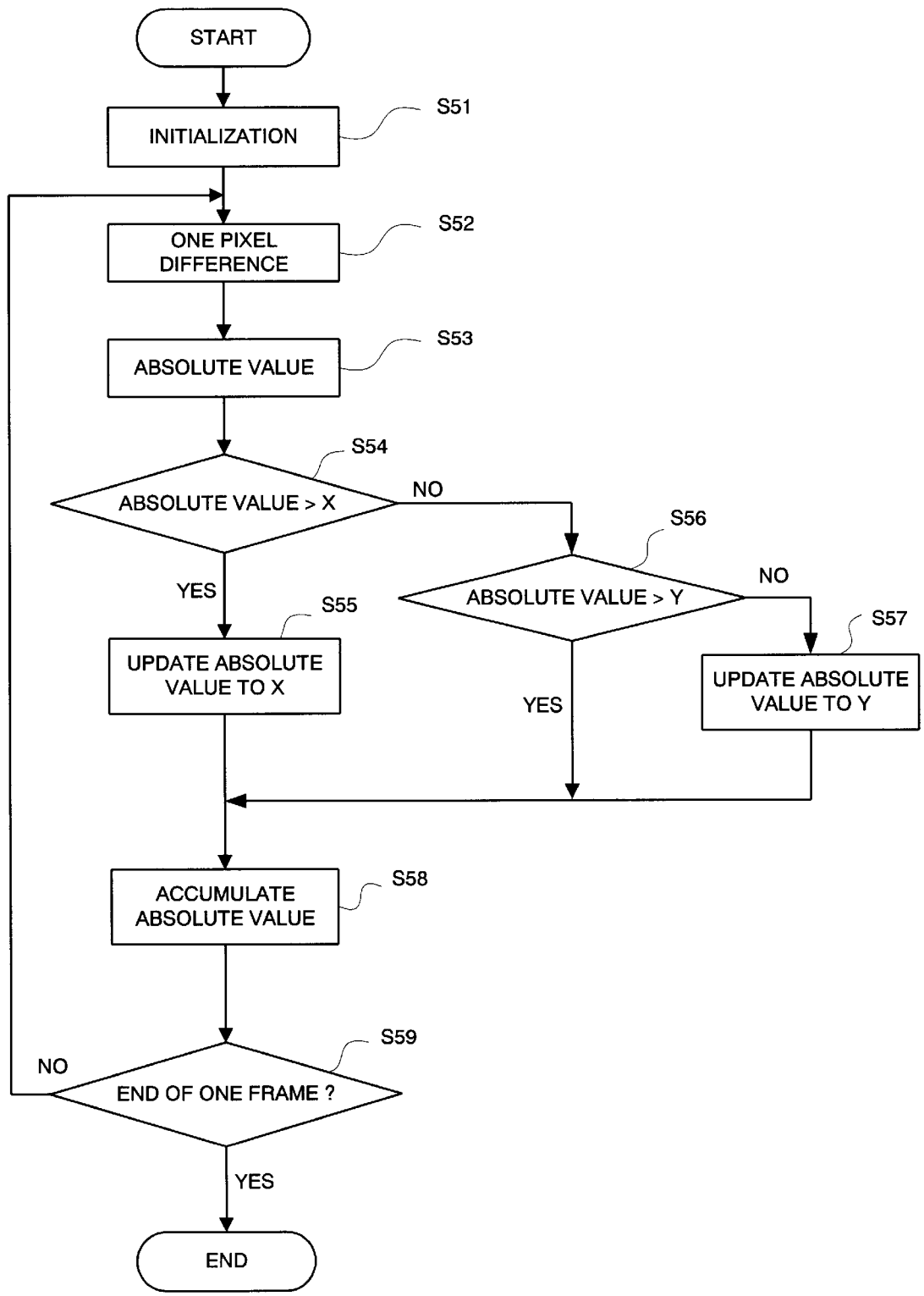
FIG. 12 is a flowchart showing the operation of an interframe difference calculation means which is a second embodiment of the present invention.

FIG. 12 is a flowchart showing the operation of an interframe difference calculation means which is the second embodiment of the present invention.

In the interframe difference calculation means 13, in order not to erroneously detect locally rapid motion as a scene change, the processing shown in FIG. 12 is added to the processing at the step S31 in FIG. 6.

First, the interframe difference calculation means 13 resets a variable "sum" for accumulating difference absolute values between frames to be zero (step S51 in FIG. 12).

Successively, the interframe difference calculation means 13 obtains a difference value between corresponding pixel data that stand at the same position in a current frame to be processed and a frame that was input just before (step S52), and converts this difference value into an absolute value (step S53).

The interframe difference calculation means 13 compares the calculated difference absolute value with a predetermined threshold value X (step S54). And, in case that the difference absolute value is larger than the threshold value X (YES at the step 54), the interframe difference calculation means 13 updates the difference absolute value to the threshold value X (step S55). Here, the threshold value X is a predetermined upper limit value, and is set to 70%, for example, of the maximum value that the difference absolute value can reach.

In case that the difference absolute value is less than or equal to the threshold value X, the interframe difference calculation means 13 compares the difference absolute value with a predetermined threshold value Y (step S56). And, in case that the difference absolute value is less than or equal to the threshold value Y (NO at the step 56), the interframe difference calculation means 13 updates the difference absolute value to the threshold value Y (step S57). Here, the threshold value Y is a predetermined lower limit value, and is set to 5%, for example, of the maximum value that the difference absolute value can reach.

Next, the interframe difference calculation means 13 adds to the variable "sum" the difference absolute value that is corrected to be between the threshold value Y and the threshold value X (step S58).

And, the interframe difference calculation means 13 repeats the processing at the steps S52 to S58 for every pixel until the processing is completed for all pixels of frames to be processed (step S59).

After completion of the processing of FIG. 12, as explained at the step S31, the interframe difference calculation means 13 obtains a sum total of the difference absolute values for one frame, and calculates a frame average value.

As mentioned above, according to this embodiment, when there is a part in an input image in which a change content is locally large, the influence thereof on a frame average value can be suppressed, and it is possible to suppress the erroneous detection of a scene change.

In accordance with the present invention, after an absolute value of a difference is calculated for every corresponding pixel data between continuous two frames, an average value per frame and an average value per scene of the difference absolute value are calculated, and the average value per frame that is referred to as a frame average value is compared with the average value per scene that is referred to as a scene average value, and a scene change of a moving picture is detected. In the present invention, by using the scene average value for detecting the scene change, when a first scene in a stationary state or which only moves slightly, and a second scene that moves somewhat larger than the first scene alternately occur, it is not determined that the scene change has occurred. Thereby, since interframe predictive coding can be conducted, compared with the conventional method in which only a difference between frames is used for detecting the scene change, it is possible to conduct compression with better coding efficiency.

Also, in case that the frame average value is smaller than a predetermined lower limit value, since, by updating this frame average value to the lower limit value, the lower limit value is set to the frame average value, erroneous detection of a small change on a screen can be eliminated, and it is possible to exactly detect the scene change. As a result, even though fading processing is applied to an input image data, the erroneous detection can be avoided.

Also, in case that the difference absolute value is larger than a predetermined upper limit value, since, by updating this difference absolute value to the upper limit value, the upper limit value is set to the difference absolute value, to increase an average value of a whole frame is prevented even for a scene in which there is locally a large change on a part of a screen, and thereby, erroneous detection can be avoided, and it is possible to exactly detect the scene change.

Also, in case that the frame average value is zero, by using a frame average value that was calculated just before, since to make the scene average value go wrong is prevented by excluding the case in which the frame average value is zero, erroneous detection can be avoided, and it is possible to exactly detect the scene change even in a case in which the same frames are continuously input because an input frame rate is lower than an output frame rate, and frame interpolation is needed.

Also, in case that the scene change is detected in compressing a moving picture, by changing a frame type so that intra-frame coding is conducted without conducting predictive coding between frames having low correlation, the frame type is changed to an optimum frame arrangement for every change of a scene, and thereby, the predictive coding does not become to be conducted by crossing over discontinuous scenes, and it is possible to conduct compression with good coding efficiency.

Also, when the frame average value is more than or equal to a predetermined number times as large as the scene average value, it is determined that the scene change has occurred, and thereby, it is possible to exactly and easily detect the occurrence of the scene change.

Also, by calculating the difference absolute value for each of a luminance component and a color difference component, erroneous detection can be avoided even for a scene in which brightness changes as a whole, and even for a scene in which brightness does not change so much and only a color component changes largely, it is possible to exactly detect the scene change.

Also, in case that the difference absolute value is less than or equal to a predetermined upper limit value and is less than or equal to a predetermined lower value, since, by updating this difference absolute value to the lower limit value, the lower limit value is set to the difference absolute value, even though there is a part in an input image in which a change content is locally large, the influence thereof on a frame average value can be suppressed, and it is possible to suppress the erroneous detection of a scene change.

The entire disclosure of Japanese Patent Application No. 11-249722 filed on Sep. 3, 1999 including specification, claims, drawing and summary are incorporated herein by reference in its entirety.

What is claimed is:

1. A moving picture encoding method, comprising:
   calculating an absolute value of a difference for every corresponding pixel data between continuous two frames, the continuous two frames corresponding to a current frame and a most previous adjacent frame;
   calculating, for said current frame, an average value per frame and an average value per scene of said absolute value of said difference;
   comparing said average value per frame with said average value per scene; and
   detecting a scene change of a moving picture between said current frame and said most previous adjacent frame as a result of the comparing.

2. A moving picture encoding method according to claim 1, wherein, in case that said average value per frame is smaller than a predetermined lower limit frame average value, the method comprising:
   updating said average value per frame for said current frame to said predetermined lower limit frame average value; and
   comparing said updated average value for said current frame with said average value per scene to determine if the scene change has occurred between said current frame and said most previous adjacent frame.

3. A moving picture encoding method according to claim 2, wherein the predetermined lower limit frame average value is utilized so that a scene change is not detected to have occurred soon after an image fade-in or an image fade-out corresponding to a most recently detected scene change has occurred in the moving picture.

4. A moving picture encoding method according to claim 1, wherein, in case that said absolute value of said difference is larger than a predetermined upper limit frame average value, the method comprising:
   updating said absolute value of said difference for said current frame to said predetermined upper limit frame average value; and
   calculating said average value per frame and said average value per scene.

5. A moving picture encoding method according to claim 1, wherein, in case that said average value per frame is zero, the method comprising:
   after updating said average value per frame for said current frame to an average value per frame which was previously calculated just before for said most previous adjacent frame; and
   comparing said updated average value for said current frame with said average value per scene to determine if the scene change has occurred between said current frame and said most previous adjacent frame.

6. A moving picture encoding method according to claim 1, wherein, in compressing a moving picture by combining intra-frame coding, which conducts coding with processing within a frame, with interframe predictive coding using a reference frame before or after with respect to time, in case that said scene change is detected, the method comprising:
   only performing intraframe predictive coding for the current frame.

7. A moving picture encoding method according to claim 6, wherein, in case where the scene change is detected between the current frame and the most recently processed adjacent frame and where the current frame is a P frame, changing the current frame to an I frame and only performing intra-frame processing on the current frame.

8. A moving picture encoding method according to claim 1, wherein, when said average value per frame is more than or equal to a predetermined number times as large as said average value per scene, it is determined that said scene change has occurred.

9. A moving picture encoding method according to claim 1, wherein said absolute value of said difference is calculated for each of a luminance component and a color difference component.

10. A moving picture encoding method according to claim 1, wherein, in case that said absolute value of said difference is less than or equal to a predetermined upper limit frame average value and is less than or equal to a predetermined lower frame average value, the method comprising:
    updating said absolute value of said difference for said current frame to said predetermined lower limit frame average value; and calculating said average value per frame and said average value per scene.

11. A moving picture encoding apparatus comprising:

calculation means for, after calculating an absolute value of a difference for every corresponding pixel data between continuous two frames, calculating an average value per frame and an average value per scene of said absolute value of said difference, the continuous two frames corresponding to a current frame and a most previous adjacent frame; and determination means for comparing said average value per frame with said average value per scene, and for detecting a scene change of a moving picture as a result of the comparing.

12. A moving picture encoding apparatus according to claim 11, wherein, in case that said average value per frame is smaller than a predetermined lower limit frame average value, said calculation means updates said average value per frame to said predetermined lower limit frame average value.

13. A moving picture encoding apparatus according to claim 12 wherein the predetermined lower limit frame average value is utilized so that a scene change is not detected to have occurred soon after an image fade-in or an image fade-out corresponding to a most recently detected scene change has occurred in the moving picture.

14. A moving picture encoding apparatus according to claim 11, wherein, in case that said absolute value of said difference for said current frame is larger than a predetermined upper limit frame average value, after updating said absolute value of said difference for said current frame to said predetermined upper limit frame average value, said calculation means calculates said average value per frame and said average value per scene.

15. A moving picture encoding apparatus according to claim 11, wherein, in case that said average value per frame is zero, said calculation means updates said average value per frame for said current frame to an average value per frame which was previously calculated just before for said most previous adjacent frame.

16. A moving picture encoding apparatus according to claim 11, wherein, in compressing a moving picture by combining intra-frame coding, which conducts coding with processing within a frame, with interframe predictive coding using a reference frame before or after with respect to time, said apparatus further comprises means for making only intraframe predictive coding to be conducted in case that said scene change is detected by said determination means.

17. A moving picture encoding apparatus according to claim 16, wherein, in case where the scene change is detected between the current frame and the most recently processed adjacent frame and where the current frame is a P frame, said means for making only intraframe predictive coding only performs intra-frame processing on the current frame.

18. A moving picture encoding apparatus according to claim 11, wherein, when said average value per frame is more than or equal to a predetermined number times as large as said average value per scene, said determination means determines that said scene change has occurred.

19. A moving picture encoding apparatus according to claim 11, wherein said calculation means calculates said absolute value of said difference for each of a luminance component and a color difference component.

20. A moving picture encoding apparatus according to claim 11, wherein, in case that said absolute value of said difference is less than or equal to a predetermined upper limit value and is less than or equal to a predetermined lower frame average value, after said absolute value of said difference is updated to said predetermined lower limit frame average value, said calculation means calculates said average value per frame and said average value per scene.

* * * * *